United States Patent [19]
Edwards et al.

[11] Patent Number: 5,103,631
[45] Date of Patent: Apr. 14, 1992

[54] DIFFERENTIAL GEAR ASSEMBLY

[75] Inventors: Geoffrey Edwards, Rugby; Michael G. Clarke, Dorset, both of England

[73] Assignee: Rolls-Royce plc, London, England

[21] Appl. No.: 480,638

[22] Filed: Feb. 15, 1990

[30] Foreign Application Priority Data

Mar. 14, 1989 [GB] United Kingdom ............... 8905820

[51] Int. Cl.⁵ .................................................. F02C 1/06
[52] U.S. Cl. ................................ 60/39.161; 60/39.163; 60/39.2; 74/DIG. 5
[58] Field of Search ............. 60/39.161, 39.33, 39.162, 60/39.163, 39.2; 475/248, 252, 253; 74/665 E, DIG. 5

[56] References Cited

U.S. PATENT DOCUMENTS

| | | | |
|---|---|---|---|
| 832,991 | 10/1906 | Mooers | 475/253 |
| 2,803,943 | 8/1957 | Rainbow | 60/39.33 |
| 2,900,846 | 8/1959 | Lehman | 475/252 |

Primary Examiner—Richard A. Bertsch
Assistant Examiner—Howard R. Richman
Attorney, Agent, or Firm—Cushman, Darby & Cushman

[57] ABSTRACT

A differential gear assembly which is suitable for providing a power off-take from a gas turbine engine, comprises first and second power input gears which drive a plurality of idler gears rotatably mounted on a common cage structure. The idler gears are grouped in meshing pairs so that one idler gear of each pair is additionally in meshing engagement with one of the power input gears and the other idler gear of each pair is additionally in meshing engagement with the other of the power input gears. Together the first and second power input gears drive the common cage structure at the mean speed of the power input gears and the common cage structure in turn drives a single power output shaft.

5 Claims, 2 Drawing Sheets

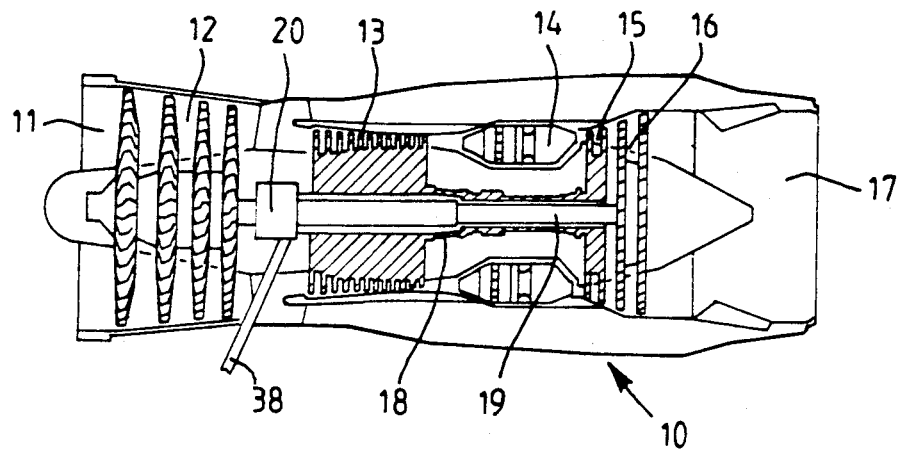
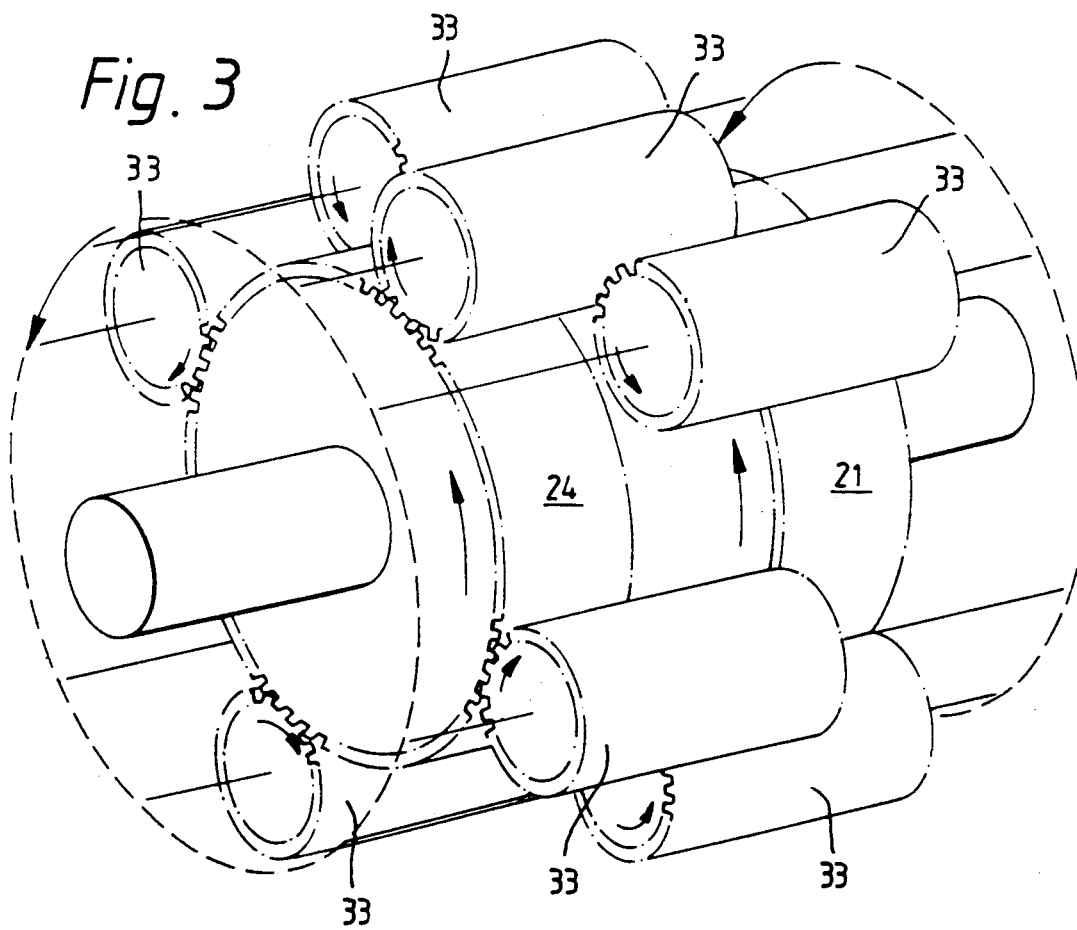

DIFFERENTIAL GEAR ASSEMBLY

This invention relates to a differential gear assembly and in particular to a differential gear assembly for use with a gas turbine engine.

It is a common requirement of gas turbine engines, particularly gas turbine engines which are intended for use in industrial or marine environments, to be provided with a power offtake from the so-called "cold" end of the engine i.e. the end where air compression takes place. Typically such engines are provided with high and low pressure axial flow compressors which are driven by independent shafts from the engines' turbines. The shafts are almost always driven at different rotational speeds in order to facilitate the efficient operation of the engine. Thus prior attempts at providing a power offtake from the engine cold end have centred around a direct drive power offtake driven by one of the drive shafts to the high and low pressure compressors.

In practice it has been found that if the power offtake is driven by the shaft which drives the low pressure compressor, the offtake of power can only be achieved with acceptable efficiency if the engine is operating at half power or above. If the power offtake is driven by the shaft which drives the high pressure compressor, it has been found that there is an unacceptable deterioration in compressor performance.

It is an object of the present invention to provide a differential gear assembly suitable for use as a gas turbine engine power offtake in which such difficulties are substantially avoided.

According to the present invention, a differential gear assembly comprises first and second power input gears and a plurality of idler gears mounted for rotation on a common cage structure, said common cage structure in turn being mounted for rotation relative to said first and second power input gears, said idler gears being grouped in meshing pairs, one idler gear of each pair being additionally in meshing engagement with one of said power input gears and the other idler gear of each pair being additionally in meshing engagement with the other of said power input gears to that together said first and second power input gears drive said common cage structure via said idler gears, said common cage structure in turn being adapted to drive a single power output shaft.

The invention will now be described, by way of example, with reference to the accompanying drawings in which:

FIG. 1 is a sectioned side view of a gas turbine engine provided with a differential gear assembly in accordance with the present invention.

FIG. 3 is a diagrammatic view of the gearing arrangement of the differential gear assembly shown in FIG. 2.

Figure 2:
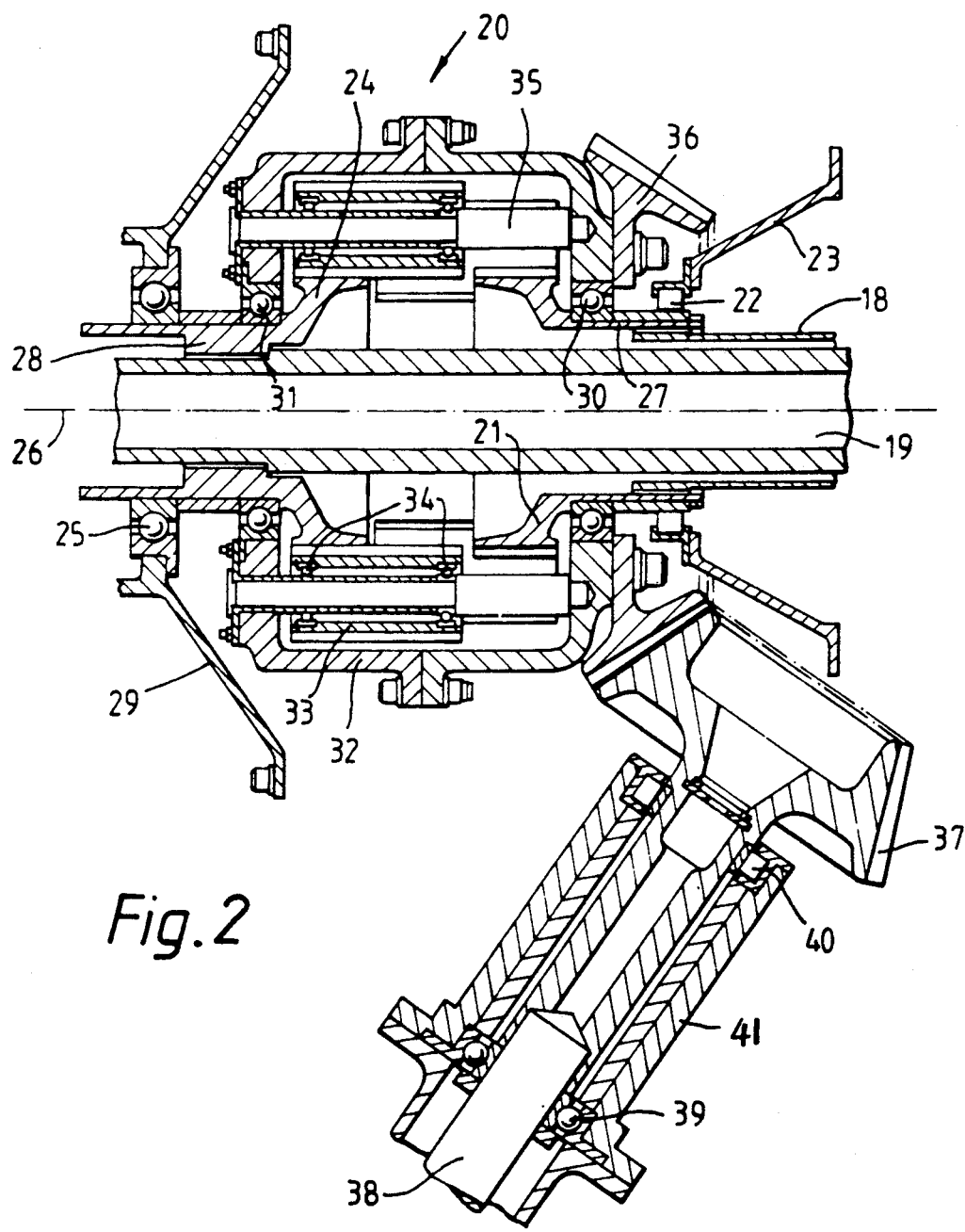
FIG. 2 is a sectioned side view of the differential gear assembly provided in the gas turbine engine shown in FIG. 1.

With reference to FIG. 1, gas turbine engine generally indicated at 10 is of conventional construction and comprises, in axial flow series, an air intake 11, a low pressure compressor 12, a high pressure compressor 13, combustion equipment 14, a high pressure turbine 15, a low pressure turbine 16 and an exhaust outlet 17. The high pressure compressor 13 is driven by the high pressure turbine 15 via a first hollow shaft 18. Similarly the low pressure compressor 12 is driven by the low pressure turbine 16 via a second hollow shaft 19 which is coaxially disposed within the first hollow shaft 18.

The gas turbine engine 10 operates in the conventional manner whereby air drawn in through the air intake 11 is compressed by the low pressure compressor 12 before passing into the high pressure compressor 13 where it is compressed further. The compressed air then flows into the combustion equipment 14 where it is mixed with fuel and the mixture combusted. The resultant hot combustion products then expand through the high and low pressure turbines 15 and 16 before being exhausted to atmosphere through the exhaust nozzle 17. It will be appreciated that although it is not shown in the drawing, a power turbine may be located downstream of the exhaust nozzle 17 to be driven by the exhaust gases.

In order to provide a single power offtake from both of the first and second shafts 18 and 19, a differential gear assembly 20 which is driven by both shafts 18 an 19 is located between the low and high pressure compressors 12 and 13.

The internal construction of the differential gear assembly 20 can be seen if reference is now made to FIG. 2.

The first hollow shaft 18, which interconnnects the high pressure turbine 15 with the high pressure compressor, extends a short distance upstream of the high pressure compressor 13 to drivingly engage the radially inner surface of an axially elongate flanged portion 27 of a first power input spur gear 21. The first power input gear 21 is supported by a bearing 22 which interconnects the elongate flanged portion 27 with a support cone 23 which is attached to static engine structure (not shown).

The second hollow shaft 19 which interconnects the low pressure turbine 16 with the low pressure compressor 12 drivingly engages the radially inner surface of an axially elongate flanged portion 28 of a second power input spur gear 24. The second power input gear 24 is supported by a bearing 25 which interconnects the elongate flanged portion 28 with a further support cone 29 which is attached to static engine structure (not shown).

The first and second power input gears 21 and 24 are coaxial with the common rotational axis 26 of the first and second hollow shafts 18 and 19. The flanged portions 27 and 28 of the first and second power input gears 21 and 24 respectively carry bearings 30 and 31 which support a cage structure 32. It will be seen therefore that the cage structure 32 is rotatable about the axis 26.

The cage structure 32 carries a plurality of similar idler gears 33. Each idler gear 33 is supported by bearings on a shaft 35. Each shaft 35 is in turn mounted within the cage structure 32 so as to be parallel with the axis 26.

The idler gears 33 are grouped in pairs as can be seen more easily if reference is now made to FIG. 3. The idler gears 33 of each pair mesh with each other. However they are axially staggered so that one idler gear 33 of each pair is additionally in meshing engagement with the first power input gear 21 which the other idler gear 33 of each pair is in meshing engagement with the second power input gear 24.

The relationship between the idler gears 33 and the first and second power input bears 21 and 24 is such that rotation of the first and second power input gears in the same direction results in the cage structure 32 also being rotated in the same direction as indicated by the arrows in FIG. 3. If the rotational speeds of the first and second power input gears 21 and 24 are not the same, there will also be rotation of the idler gears 33 so that the cage structure 32 will be driven at the mean rotational speeds of the first and second power output gears 21 and 24.

A bevel gear 36 is attached to one end of the cage structure 32 so as to rotate coaxially therewith. The bevel gear 36 meshes with a corresponding bevel gear 37 provided on the end of a power output shaft 38. The power output shaft 38 and bevel gear 37 are supported by bearings 39 and 40 located on fixed engine structure 41. The power output shaft 38 may be directed to provide power in any convenient location, such as an electrical power generator (not shown).

It will be seen therefore that the differential gear assembly in accordance with the present invention provides an output drive shaft 38 which derives its power from two power input shafts which need not be rotating at the same speed nor providing the same degree of torque.

The torque required to drive the output drive shaft 38 is, since the gears 21 and 24 are the same diameter, equally split between the two power input shafts 18 and 19. It may be desired however in certain circumstances to provide a different division of torque split between the two power input shafts. This can be achieved by modifying the gear assembly so that one of gears 21 and 24 is of larger diameter than the other. Thus the torque split between the power input shafts 18 and 19 would, in such circumstances, be directly related to the ratio of the diameters of the input gears 21 and 24. Of course any use of input gears 21 and 24 which are not of the same diameter would necessitate the appropriate repositioning of the idler gears 33.

Although the present invention has been described with reference to a differential gear assembly for a gas turbine, it will be appreciated that it could be used in other suitable situations in which a single power output shaft is required to be driven by two separate power inputs shafts which may be rotating at different speeds.

We claim:

1. A gas turbine engine provided with first and second axially-spaced apart air compressors, said gas turbine engine being further provided with a differential gear assembly located between said first and second air compressors, said gear assembly comprising first and second power input gears and a plurality of idler gears mounted for rotation on a common cage structure, said common cage structure in turn being mounted for rotation relative to said first and second power input gears, said idler gears being grouped in meshing pairs, one idler gear of each said meshing pair being additionally in meshing with one of said power input gears and the other idler gear of each said meshing pair being additionally in meshing engagement with the other of said power input gears so that together said first and second power input gears drive said common cage structure via said idler gears, said common cage structure in turn being adapted to drive a single power output shaft, each of said first and second power input gears being provided with an axially-extending flange, said common cage structure being supported for rotation from bearings provided on said flanges.

2. A gas turbine engine as claimed in claim 1 wherein each of said first and second power input gears of said differential gear assembly and said common cage structure of said differential gear assembly are mounted for rotation about a common axis.

3. A gas turbine engine as claimed in claim 1 wherein said power input gears of said differential gear assembly are spur gears of the same external diameter.

4. A gas turbine engine as claimed in claim 1 wherein said common cage structure of said differential gear assembly has a bevel gear being adapted to drive a corresponding gear provided on said power output shaft.

5. A gas turbine engine as claimed in claim 1 wherein said first and second power input gear of said differential gear assembly are driven by first and second shafts which also respectively drive said first and second air compressors.

* * * * *